H. QUERTIER.
TIME AND SPEED INDICATING AND RECORDING MEANS.
APPLICATION FILED MAR. 8, 1912.

1,061,121.

Patented May 6, 1913.

2 SHEETS—SHEET 1.

Witnesses

Inventor
Hilary Quertier his Attorneys

H. QUERTIER.
TIME AND SPEED INDICATING AND RECORDING MEANS.
APPLICATION FILED MAR. 8, 1912.
1,061,121.
Patented May 6, 1913.
2 SHEETS—SHEET 2.
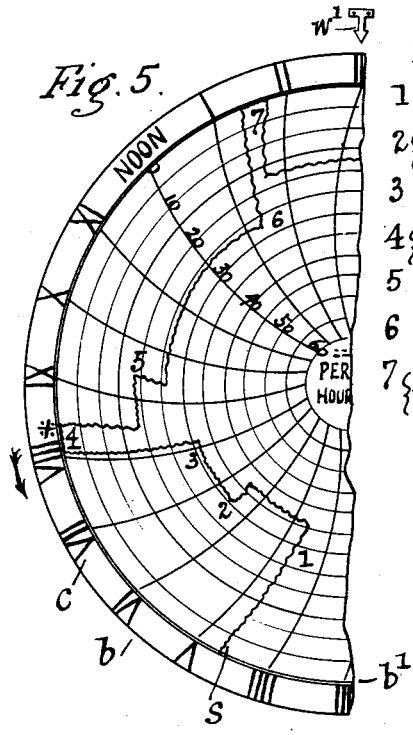
Place.—$b^2$
1 ..............
2 { Run through Station 2
3 ..............
4 { Let Mail Train Pass.✶
5 ..............
6 ..............
7 { Dinner
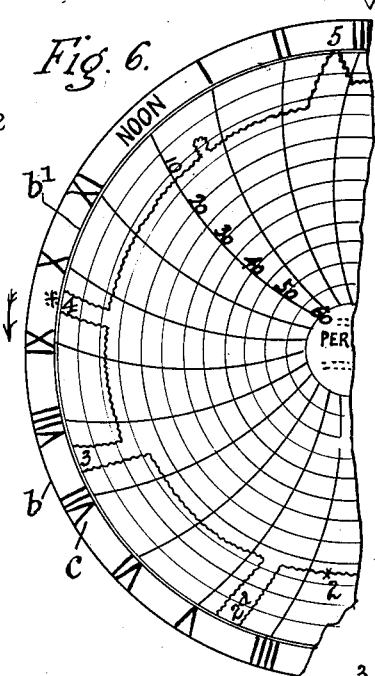
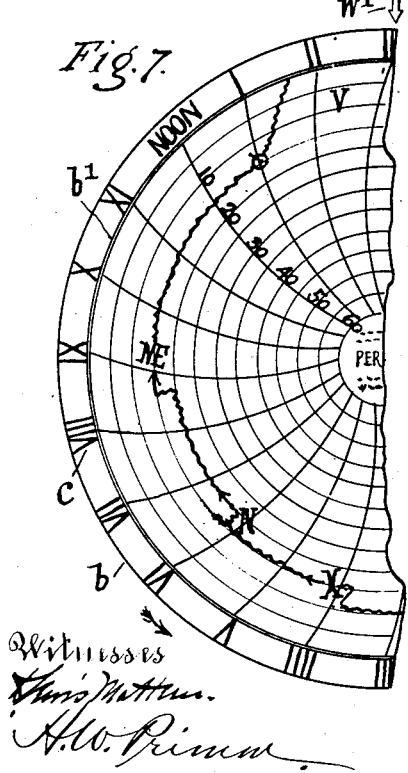
$b^3$
Hour. Knots speed.
IIII  15
Course:—
VI  20
IX  15
IPM.
○ Pick up Light on N.W.
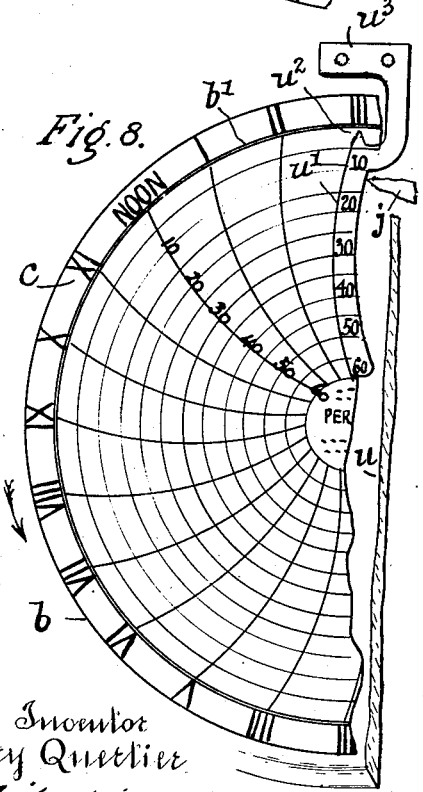
Witnesses
Inventor
Hilary Quertier
his Attorneys

UNITED STATES PATENT OFFICE.

HILARY QUERTIER, OF MELBOURNE, VICTORIA, AUSTRALIA.

TIME AND SPEED INDICATING AND RECORDING MEANS.

1,061,121.  Specification of Letters Patent.  Patented May 6, 1913.

Application filed March 8, 1912. Serial No. 682,489.

*To all whom it may concern:*

Be it known that I, HILARY QUERTIER, a subject of the King of Great Britain and Ireland, &c., residing at Fitzroy street, St. Kilda, Melbourne, in the State of Victoria, Commonwealth of Australia, have invented certain new and useful Improvements in Time and Speed Indicating and Recording Means; and I do hereby declare the following to be a full, clear, and exact description of the invention, such as will enable others skilled in the art to which it appertains to make and use the same.

My invention relates to improved means usable principally for graphically indicating and recording, by the production of speed curves, times and distances traveled or to be traveled. It is applicable in connection with a ship, locomotive, motor vehicle, machinery, and so on. It will record on clock faced charts, or time exhibiting sheets, the time taken to travel given routes, the rates of speed (say in miles per hour) at each part of the journey of the locomotive, car, or so forth, and the time of each start and stop. The charts are adapted to be specially marked in advance, becoming thus instruction or guide sheets also. Distances covered are also shown by cyclometer.

I provide upon a suitable table or support a removable chart or graph sheet, of paper, aluminum, slate, celluloid, or other suitable material, printed or marked with concentric circles as speed lines; and curved radial lines crossing the circles as time curves. The sheet is made to revolve once in twenty-four hours, or other predetermined period, by any convenient actuating means, as clock work, or electrical energy, and with the aid of a pointer, and dial characters, acts as a clock face during use. The charts may be variously prepared for use as I shall further explain, and the mechanism will also be explained by reference to the accompanying drawings. A chart may be prepared for the use if desired of both its sides in turn, and may receive erasible or permanent marking.

Figure 1:
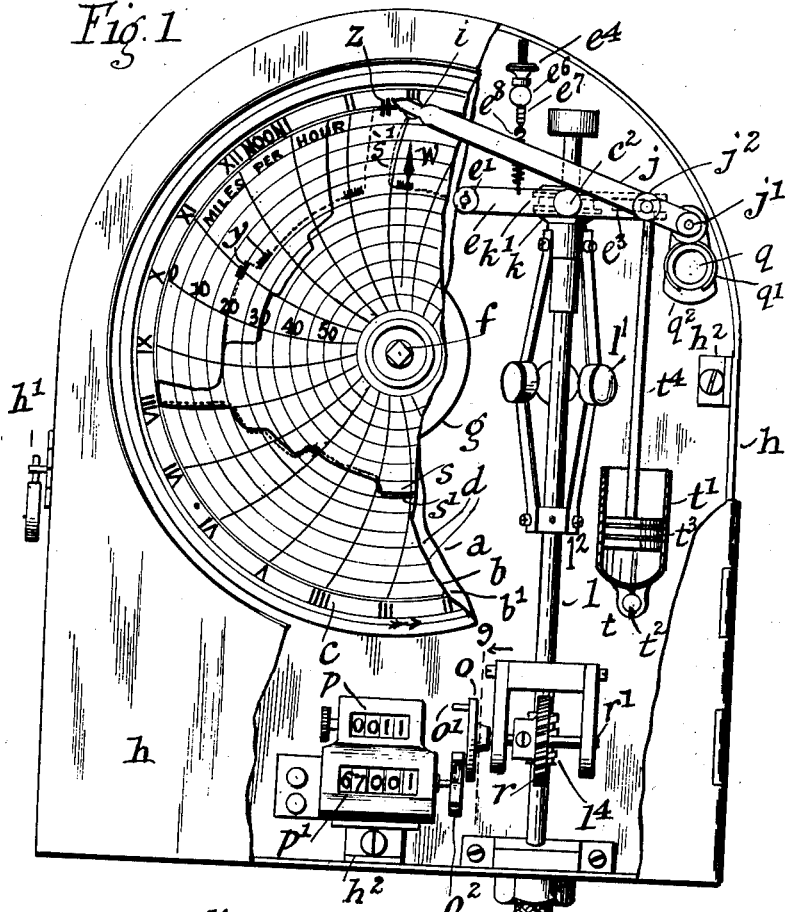
Figure 2:
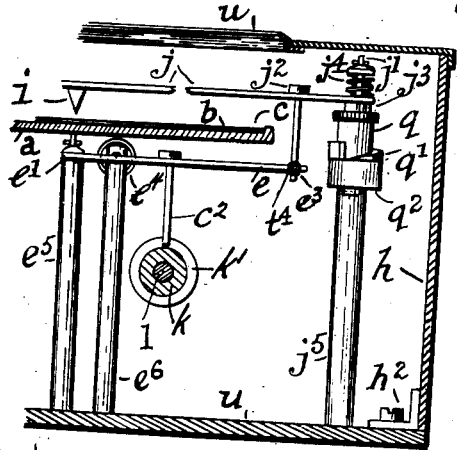
Figures 3, 4:
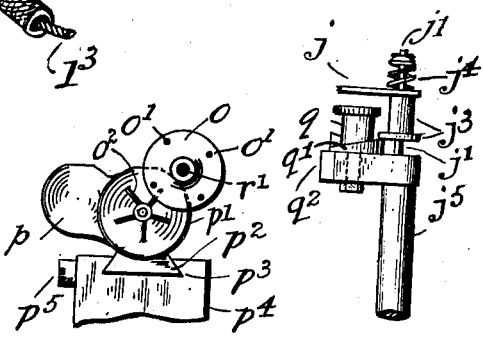

Figure 1 represents a plan view of a convenient form of my instrument as when set horizontally, the chart being partly omitted to exhibit parts beneath. Fig. 2 is a view of part of the instrument of Fig. 1 in vertical section. Fig. 3 is an elevation at right angles to the view in Fig. 2. Fig. 4 is a side view of the cyclometer and its actuating means, on line 9 of Fig. 1. Figs. 5 to 7 represent parts of various charts. Fig. 8 shows a chart blank with speed indication means independent of and above it combined with a time indicator.

$a$ represents a table or support for a sheet $b$ which is marked circumferentially at $c$ in hours, or other time divisions and may have any further sub-divisions as on other clock faces in use to exhibit time. This chart is marked with concentric circles $d$ to represent progressive rates of speed, as shown by numbers 10, 20, and so on, to represent miles or knots for example,—or number of revolutions—per hour or other time unit.

$f$ is a spindle turned at a predetermined rate as by clock work contained in a casing $g$, and the chart and mechanism are inclosed in a casing $h$ of any suitable kind, which may be locked as at $h^1$. The spindle $f$ turns the table $a$, to which the chart is fixed, once in a given time, as each twenty-four hours, for example.

The instrument illustrated has a base plate as $u$, and the casing $h$ is affixed thereto as by lugs and screws $h^2$, so that the casing $h$ may be bodily removed without interfering with the mechanism, which will thereby be made accessible for adjustment, or other attention. Such details may be varied.

$i$ is a pen or other record marker, on a lever or arm $j$, which is caused to move on its pivot as post $j^1$ by a speed governor $l^2$, having a spindle $l$ which is actuated by reason of connection to some suitable part, as will be well understood, of the motor car, locomotive, ship's log, or engine shaft, or so on. This connection is represented by flexible shafting $l^3$, but rigid connections are, where suitable not excluded from use.

When there is an increase in the speed of the governor its balls or weights $l^4$, or the like move outwardly, drawing down a movable collar $k$ grooved at $k^1$, into which groove a pin $c^2$ projects from an arm $e$, pivoted as at $e^1$ to a support $e^5$ of the casing. Thus the governor swings arm $e$, which has a suitable slot $e^3$ or connecting means supporting a suitable connection as a pin the head of which is marked $j^2$ on arm $j$ through which this pin passes, so that when arm $e$ swings, it swings the arm $j$. The faster spindle $l$ rotates the farther the arm $j$ will swing on its pivot, so that its pen or marker $i$ will pass across the sheet $b$, toward its center,—or it might be arranged to swing from center to circumference,—as the speed rises.

The governor may be set to work in either a horizontal or a vertical position; and it may be driven by gears; its ball arms may be jointed rods, and other such details may vary. Any suitable means for adjustment of arm $e$ is provided—as a milled nut $e^4$ on a rod (graduated as at $e^7$ to allow of such adjustment being facilitated), the latter being attached as by a small spiral spring $e^8$ to arm $e$.

$e^6$ is a post in the casing against which nut $e^4$ may bear, and as the latter is turned it will draw the rod through a hole in the post or will release the rod so that the spring $e^8$ will pull more or less on arm $e$ according to the adjustment. When adjusting I use for comparison a standard instrument, or make trial runs, on measured distances, the adjustment being effected to cause the arm $j$ and its marker to indicate accurately, or to reduce inaccuracy.

$w$ is a pointer on the glass or like face over chart $b$; and it shows the time by the rotation past its end of the hour divisions $c$. Any other suitable pointer is usable as one fixed within the casing, or externally, as in Fig. 5.

When the vehicle, ship, or other subject of record is not in motion, the pencil, pen, or the like $i$ will normally continue to mark upon the rotating sheet $b$, but on a line or place $b^1$ indicating rest or stoppage, so that the period of such inaction becomes recorded. The result will be that the chart will become marked so as to show, not only the distance traveled, but also the time of each start and stop, and the rate of speed at each part of the time. Means are however provided to allow the making of a lineal or marked record to be discontinued. Thus pen or marker $i$ may be raised so as not to touch sheet $b$. This may be done as by having a spiral or cam surface $q^1$ on a spindle $q$, on a post supported by a bracket $q^2$ of post $j^5$. The turning of part $q$ thus causes the spiral or cam to move under and lift a boss $j^3$ under arm $j$ so raising the latter so that the marker or pen will be clear of the chart. The raising of part $j^3$ overcomes the pressure of a spring $j^4$ which normally holds arm $j$ in marking position.

In order to prevent objectionable markings of variations of speed from appearing on the chart, the instrument is provided with a dashpot $t$, with a rod $t^4$ attached to that end of lever $e$ in which pin $j^2$ is engaged. This dashpot may consist of a cylinder $t^1$ suitably supported pivotally as at $t^2$. A graphite or suitable plunger $t^3$ is attached to rod $t^4$, and is a neat fit in the cylinder so that by downward motion it compresses air in the lower end of the cylinder, while on the upward motion the suction in the said lower end prevents unduly rapid jerks in the movement of rod $t$ and therefore of arm $e$. The details of the dashpot may vary however. Mounted on shaft $l$ is a worm wheel $l^4$ which turns a wheel $r$, or spindle $r^1$ and thus rotates a disk $o$ which has one or when so desired a series of pins $o^1$ adapted to operate a cyclometer $p$ which shows in figures (in miles or other predetermined units) the traveled distance, of the trip—for example; while the total travel since the cyclometer was set to zero would, if required, be shown also in figures as at $p^1$. The number of pins inserted in disk $o$ may be varied, or the cyclometer star wheel $o^2$ may be changed to vary the record, without altering the described worm gearing, or the speed of governor shaft $l$.

The cyclometer is removably set as by having a base $p^2$ slid into a groove $p^3$ in any suitable support $p^4$, from which it may be detached by loosening a fastening as screw $p^5$. Thus any number of cyclometers may be put into use at different times each to record some special service. For example if the same motor car were hired out to different persons, each person may have his trips recorded on his own cyclometer, and each would have his own chart records also. Again my recorder might at one time be indicating miles per hour, using one cyclometer and at another time revolutions per minute, using a different cyclometer. In Fig. 8 marks or numbers $u^1$ showing gradations of speed are put upon the transparent glass or the like cover $u$ on its under side ordinarily but may be inset or on the outside at will in suitable relation to the point or any predetermined part of the arm $j$, and this series of numbers or the like may be headed by a pointer $u^2$ or mark to indicate the time on the chart below. Instead of marking the glass an arm bar or rod may be provided at $u^1$ having the gradations with suitable speed indicating figures, and with the pointer $u^1$ between the glass $u$ and the chart, or above the latter in any suitable way. The arm is fixed suitably, as to the casing by an end $u^3$.

The advantages of the numberings on the glass or on the arm are that the figures can always be upright to the observer if the instrument is set on a wall like a clock, this not being the case with a chart which will carry the figures around with it. Moreover, the conjunction of time and speed indication is combined to the utmost. The glass $u$ may be either a plain one, or one arranged to magnify what is seen through it.

In the case of a locomotive there would ordinarily exist on the chart sheet, before the record began, a normal or guide line, showing the required or anticipated speed at various parts of the journey, and the stoppages to be made according to a schedule, or instructions. This normal marking may be in some special color, and, should special instructions or alterations be required, they will also be marked.

In Fig. 1 is shown a sample guide line $s$, as a graphic instruction to a driver. This line indicates a proposed or scheduled run, and the actual run might then be shown by the dotted line $s^1$, which would be marked by the pen or the like, during the trip, in a distinctive color or manner. Special marks as at $y$ are placed on sheet $b$ when instructions, which may override other instructions if any exist, to travel at certain speeds at certain times are to be marked. Any special marks that will be understood will do. The names of places are to be placed on the chart or indicated by some symbol or convenient reference mark (making use of marginal or other notes where desired). Thus in Fig. 7 places are marked as explained later. Any suitable wording or symbol as at $z$ will be placed on the no-speed or stoppage line $b^1$ when an instruction to stop is to be given in advance for any purpose,—as to allow one train to pass another for example.

Marking of changes of course, of speed, and other instructions, may be provided for in the case of a ship's log. The well known nautical abbreviations N for North, and so on may be retained. In Fig. 5 the wavy line $s$ represents the instructions put on the chart before a trip begins. The Figs. 1 to 7 refer to notes accompanying the chart if notes be required. It will be seen that at some figures there is a change of speed. Sample notes are also shown alongside Fig. 5. Fig. 6 shows a chart and some of the notes tabulated alongside Fig. 5 are applicable to its marking. It is marked to indicate different stations or positions on the route to be traveled, and contains directions as to train crossings for example.

Fig. 7 shows a chart usable with a ship's log to show knots per hour. This chart is shown as before the trip begins, and thus it is marked, as by an officer, with words, abbreviations, or symbols, as to order change of course, change of speed, and so on according to any code, explanatory matter provided, or understood meaning. Thus for example the mark X set on or near the 4 o'clock line and on the 15 knot line, may mean "change speed"; the mark N set on or near the 6 o'clock and 20 knot lines may mean "change course to due north and make speed 20 knots"; and so on. A sheet of memoranda, conveniently located in view of the steersman, captain or other person who would use it, would be provided for reference. An example of this is shown alongside Fig. 7.

The marking of instructions on a chart may be readily effected at any time while the clock work is in operation, as when part of a trip has been accomplished. Any danger warnings and so on as instructions to pick up lights in navigation can be marked, and when desired blanks are left between marks placed as instructions, so that no scheduled speed or times would appear at such blank places. When the chart is on suitably prepared celluloid, slate, or other such material, the record upon it may be readily erased, and a new one taken on the same chart subsequently, the time dial and speed circles being permanent. These charts with cleanable surfaces, and other charts, will in some cases be sufficiently stiff to keep in position if centrally supported, but a thin or paper chart would be supported by a table $a$ as large as the chart, or it may be larger. The clock may have any desired details and it is arranged for winding up without opening the casing, if so predetermined.

The time exhibiting chart has a transparent front (for example, at $u$, a glass cover) ordinarily on which may be placed additional indications or marks, but in the absence of such a cover or marks thereon, the time may be shown by a pointer on the casing, the pointer being located for example as illustrated at $w^1$ in Figs. 5 to 7, externally of the casing. When the marker is raised so as not to record, its arm $j$ will nevertheless act by its varying or other position relatively to the chart as an indicator, readily visible, of speed or of stoppage.

For brevity in the claims the word "spindle" is used to indicate any suitable train, log, engine or like driven spindle such as $l$.

Having described this invention what is claimed by Letters Patent is:—

1. In a speed recording instrument, the combination of a suitable casing; a movable chart in said casing adapted to be driven by a clock mechanism; an arm pivotally mounted on said casing and having a member adapted to engage with and mark the chart; a shaft adapted to be driven from an external source; a governor connected to be actuated by said shaft; operative connections between said governor and the movable arm to actuate the latter; a cam engaging with the pivotal end of said pivoted arm; and a device for adjusting said cam whereby to bodily move said arm to remove the marking member thereof from engagement with the chart, substantially as described.

2. In a speed recording instrument, the combination of a suitable casing; a movable chart in said casing adapted to be driven by a clock mechanism; an arm pivotally mounted on said casing; a second arm pivotally mounted on the casing and engaging with the first named arm; a marker carried by the second arm for contacting with and marking said chart; a shaft adapted to be driven from an external source; a governor connected to be actuated by said shaft and connected with the first named pivoted arm to move the same; and a dash-pot mounted on said casing and having engagement with the first named arm, substantially as described.

3. In a speed recording instrument, the combination of a suitable casing; a movable chart in said casing adapted to be driven by a clock mechanism; an arm pivotally mounted on said casing; a second arm pivotally mounted on the casing and engaging with the first named arm; a marker carried by the second arm for contacting with and marking said chart; a shaft adapted to be driven from an external source; a governor connected to be actuated by said shaft, and connected with the first named pivoted arm to move the same; a screw adjustably mounted on said casing; and a spring connecting said screw with the first named arm for holding the same under variable tension, substantially as described.

4. In a speed recording instrument, the combination of a suitable casing; a movable chart in said casing adapted to be driven by a clock mechanism; an arm pivotally mounted on the casing; a second arm pivotally mounted on the casing; a shaft adapted to be driven from an external source; a governor mounted on said shaft and connected to actuate the first named pivoted arm; a pin carried by the first named arm and passing through the second named arm; a marker carried by the second named arm for contacting with the chart and marking the same; a spring on the pivotal support of the marker carrying arm engaging with said arm and holding the marker thereof normally in contact with the chart; a cam engaging with the pivoted end of the marker carrying arm; a device for turning said cam to move the arm against the tension of the spring and remove the marker from engagement with the chart; and a dash-pot mounted on the casing and engaging with said first named pivoted arm, substantially as described.

In witness whereof I have hereunto set my hand in the presence of two witnesses.

HILARY QUERTIER.

Witnesses:
GEORGE G. TURRI,
MARGARET J. FRY.